(12) United States Patent
Cheatham, III et al.

(10) Patent No.: US 9,131,068 B2
(45) Date of Patent: Sep. 8, 2015

(54) SYSTEMS AND METHODS FOR AUTOMATICALLY CONNECTING A USER OF A HANDS-FREE INTERCOMMUNICATION SYSTEM

(71) Applicant: Elwha LLC, Bellevue, WA (US)

(72) Inventors: Jesse R. Cheatham, III, Seattle, WA (US); Roderick A. Hyde, Redmond, WA (US); Muriel Y. Ishikawa, Livermore, CA (US); Jordin T. Kare, Seattle, WA (US); Craig J. Mundie, Seattle, WA (US); Nathan P. Myhrvold, Bellevue, WA (US); Robert C. Petroski, Seattle, WA (US); Eric D. Rudder, Mercer Island, WA (US); Desney S. Tan, Kirkland, WA (US); Clarence T. Tegreene, Mercer Island, WA (US); Charles Whitmer, North Bend, WA (US); Andrew Wilson, Seattle, WA (US); Jeannette M. Wing, Bellevue, WA (US); Lowell L. Wood, Jr., Bellevue, WA (US); Victoria Y. H. Wood, Livermore, CA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 14/174,650

(22) Filed: Feb. 6, 2014

(65) Prior Publication Data
US 2015/0222757 A1     Aug. 6, 2015

(51) Int. Cl.
*H04M 1/00*     (2006.01)
*H04M 1/60*     (2006.01)
*H04M 9/00*     (2006.01)
*H04M 11/02*     (2006.01)
*G10L 25/48*     (2013.01)

(52) U.S. Cl.
CPC ............. *H04M 11/025* (2013.01); *G10L 25/48* (2013.01)

(58) Field of Classification Search
CPC ..... H04M 3/54; H04M 1/0291; H04M 11/00; H04Q 11/0457; H04W 76/02
USPC .......... 379/159, 160, 167.01, 167.05, 167.08, 379/167.11, 167.14
See application file for complete search history.

(56) References Cited

U.S. PATENT DOCUMENTS

| | | | | |
|---|---|---|---|---|
| 4,941,166 A | * | 7/1990 | Waldman et al. | 379/67.1 |
| 5,539,705 A | * | 7/1996 | Akerman et al. | 367/132 |
| 6,002,747 A | * | 12/1999 | Eftechiou | 379/35 |
| 6,021,190 A | * | 2/2000 | Fuller et al. | 379/212.01 |
| 6,233,328 B1 | * | 5/2001 | Wolf | 379/159 |
| 6,310,940 B1 | * | 10/2001 | Ratz | 379/88.01 |

(Continued)

*Primary Examiner* — Binh Tieu

(57) ABSTRACT

A hands-free intercom may include a user-tracking sensor, a directional microphone, a directional sound emitter, and a communication interface. The user-tracking sensor may determine a location of a user so the directional microphone can measure vocal emissions by the user and the directional sound emitter can deliver audio to the user. The directional sound emitter may emit ultrasonic waves configured to frequency convert to produce the audio. The communication interface may be configured to identify an entity of interest with which the user wishes to interact based on gestures and/or vocal emissions by the user and may automatically communicatively couple the user to the entity of interest. The hands-free intercom may determine whether remote entities requesting to communicatively couple with the user should be allowed to couple. The hands-free intercom may detect eavesdroppers and warn the user of the detected eavesdroppers.

38 Claims, 8 Drawing Sheets

(56) References Cited

U.S. PATENT DOCUMENTS

| | | | |
|---|---|---|---|
| 6,807,281 B1 | 10/2004 | Sasaki et al. | |
| 6,937,718 B2 | 8/2005 | Scholte | |
| 7,106,180 B1 | 9/2006 | Pompei | |
| 7,130,430 B2 | 10/2006 | Milsap | |
| 7,269,452 B2 | 9/2007 | Cheung et al. | |
| 7,388,962 B2 | 6/2008 | Cheung et al. | |
| 7,391,872 B2 | 6/2008 | Pompei | |
| 7,492,913 B2 | 2/2009 | Connor et al. | |
| 7,551,060 B1 | 6/2009 | Seevers | |
| 7,567,659 B2 * | 7/2009 | Kumagai | 379/159 |
| 7,801,570 B2 | 9/2010 | Cheung et al. | |
| 7,835,529 B2 | 11/2010 | Hernandez et al. | |
| 8,027,488 B2 | 9/2011 | Pompei | |
| 8,126,159 B2 | 2/2012 | Goose et al. | |
| 8,189,825 B2 | 5/2012 | Breed | |
| 8,538,036 B2 | 9/2013 | Pompei | |
| 8,861,537 B1 * | 10/2014 | Braithwaite et al. | 370/401 |
| 2001/0007591 A1 | 7/2001 | Pompei | |
| 2003/0034876 A1 * | 2/2003 | Puchek et al. | 340/5.53 |
| 2003/0185404 A1 | 10/2003 | Milsap | |
| 2004/0042615 A1 | 3/2004 | Scholte | |
| 2004/0114770 A1 | 6/2004 | Pompei | |
| 2004/0114772 A1 * | 6/2004 | Zlotnick | 381/92 |
| 2004/0209654 A1 | 10/2004 | Cheung et al. | |
| 2004/0234080 A1 | 11/2004 | Hernandez et al. | |
| 2005/0207590 A1 | 9/2005 | Niehoff et al. | |
| 2005/0248233 A1 | 11/2005 | Pompei | |
| 2006/0063517 A1 * | 3/2006 | Oh et al. | 455/415 |
| 2006/0262935 A1 | 11/2006 | Goose et al. | |
| 2007/0154035 A1 * | 7/2007 | Fukui | 381/116 |
| 2007/0165866 A1 * | 7/2007 | Super | 381/1 |
| 2007/0169555 A1 | 7/2007 | Gao et al. | |
| 2007/0274533 A1 * | 11/2007 | Lewis | 381/92 |
| 2008/0037803 A1 | 2/2008 | Breed | |
| 2008/0285777 A1 | 11/2008 | Pompei | |
| 2011/0044467 A1 | 2/2011 | Pompei | |
| 2011/0129101 A1 * | 6/2011 | Hooley | 381/92 |
| 2012/0051556 A1 | 3/2012 | Pompei | |
| 2012/0093303 A1 * | 4/2012 | Schultz | 379/159 |
| 2013/0034262 A1 * | 2/2013 | Surty et al. | 382/103 |
| 2014/0015967 A1 * | 1/2014 | Moore et al. | 348/143 |
| 2014/0071273 A1 * | 3/2014 | Balthasar et al. | 348/143 |
| 2014/0219431 A1 * | 8/2014 | Wagner et al. | 379/167.02 |

* cited by examiner

SYSTEMS AND METHODS FOR AUTOMATICALLY CONNECTING A USER OF A HANDS-FREE INTERCOMMUNICATION SYSTEM

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This application relates to systems and methods for automatically connecting a user of a hands-free intercommunication system to an entity of interest. Specifically, this application relates to determining an entity of interest based on a non-tactile input.

SUMMARY

A hands-free intercommunication system ("hands-free intercom") may be able to communicatively couple a user to an entity of interest without requiring a tactile input and/or a specific verbal phrase. The hands-free intercom may be able to determine from gestures and/or vocal emissions with whom the user wishes to speak. For example, the hands-free intercom may determine the entity of interest from the subject matter of the vocal emissions, a tone of voice, an uttered name, a spoken command, and/or the like. A communication interface may be configured to communicatively couple the user to a communication device of the entity of interest. The communication interface may determine an optimal communication device of the entity of interest with which to communicatively couple.

The hands-free intercom may include a directional microphone to receive vocal emissions from the user and a directional sound emitter to deliver audio to the user. The communication interface may communicatively couple the directional microphone and directional sound emitter to the communication device of the entity of interest to allow the user and entity of interest to communicate. The hands-free intercom may also include a user-tracking sensor configured to determine the location of the user. The directional microphone and directional sound emitter may target the user based on the location determined by the user-tracking sensor. The directional microphone may include a phased array and/or a metamaterial array to permit gain to be maximized in the direction of the user without any moving parts. The directional sound emitter may be configured to emit ultrasonic sound waves towards the user. The emitted ultrasonic sound waves may be configured to frequency convert to produce audio that is audible by the user. The frequency conversion may be produced by beating a plurality of ultrasonic sound waves together, by downshifting the ultrasonic sound waves in the air and/or in or on a material on the user, and/or the like.

The hands-free intercom may determine whether a remote entity requesting to communicatively couple with the user should be allowed to do so. The hands-free intercom may apply access rules based on context data, which may include data about the remote entity, sensing of the user, data from one or more computer systems, and/or the like. The hands-free intercom may decide whether to automatically couple the remote entity, automatically refuse to couple the remote entity, prompt the user about the remote entity, and/or the like. The hands-free intercom may refuse connections, for example, if the user is sleeping, if another person is present with the user, and/or the like. The hands-free intercom may monitor for eavesdroppers and may warn the user of an eavesdropper and/or refuse to communicatively couple the user while the eavesdropper is present.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF PREFERRED EMBODIMENTS

Figure 1:
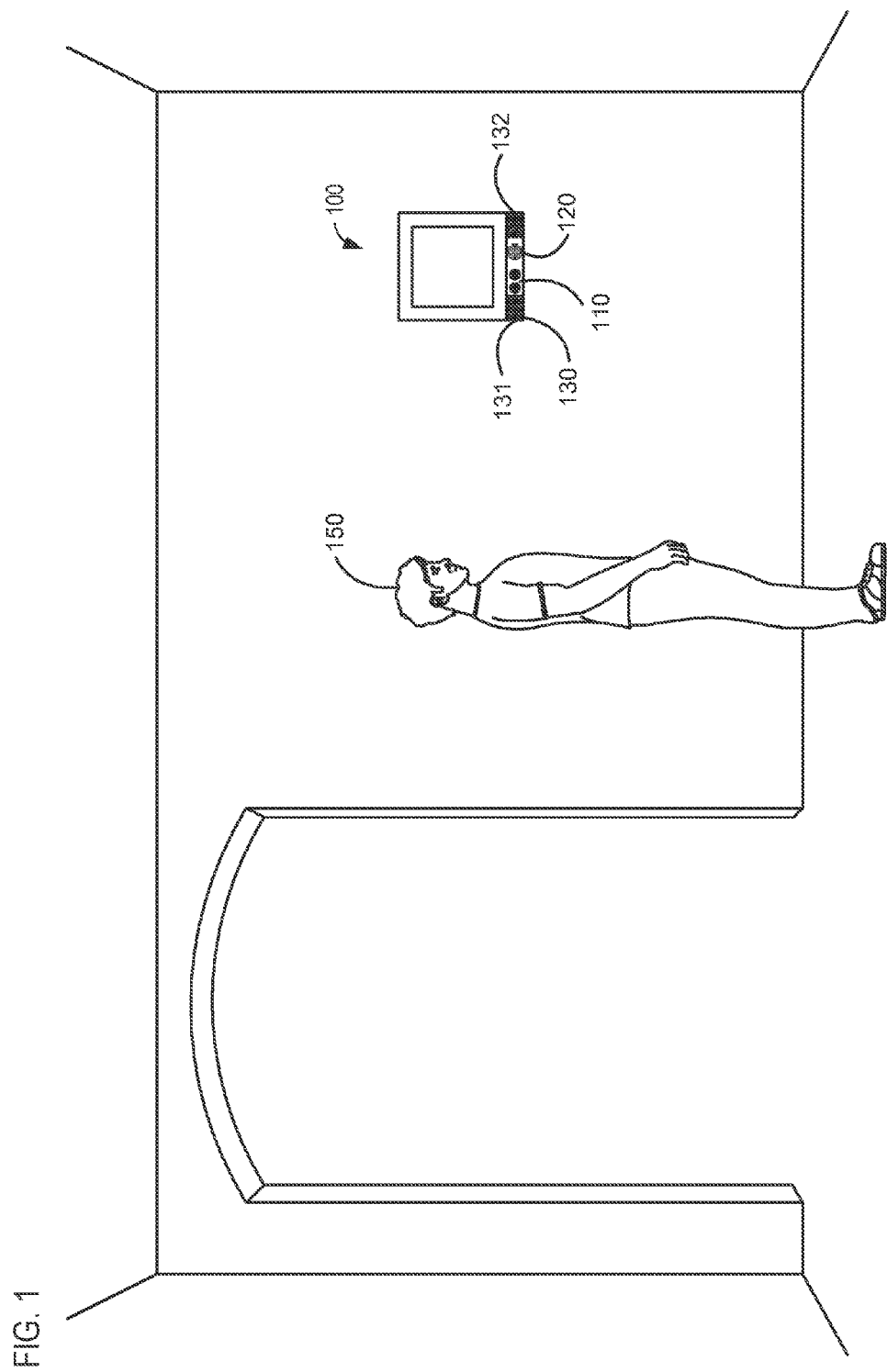
FIG. 1 is a perspective view of a user interacting with a hands-free intercom.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A conventional intercom may be able to communicatively couple users (e.g., occupants of a building, occupants of a vehicle, etc.) to each other via a plurality of user interfaces. Unfortunately, the intercom may require a tactile input to specify a desired interface rather than being able to determine a desired user based on a non-tactile input, such as a gesture or a verbal input. The intercom may require the user to wear or carry communication equipment, such as a microphone, a speaker, or a wireless transceiver. The intercom may also be unable to interact with other systems, such as cell phone networks, computer networks, local appliances, local computers, and/or the like, and thus may only be able to interact with entities via the user interfaces. The intercom may also require the user to select which device to communicate with rather than the intercom automatically selecting the communication device based on the user to be contacted. The intercom may lack access and privacy control. For example, the intercom may connect a remote entity to the user regardless of the time, who is with the user, the identity of the remote entity, etc. The intercom may not protect against eavesdroppers or keep conversations private from others near the user. Therefore, there is a need for an improved intercom that remedies these deficiencies.

A hands-free intercom may include a user-tracking sensor to determine a location of a user, a directional microphone configured to target the user and measure vocal emissions by the user, a directional sound emitter configured to target the user and deliver audio to the user, and a communication interface configured to communicatively couple the user to an entity of interest (e.g., by communicatively coupling the directional microphone and directional sound emitter to a communication device of the entity of interest). The directional microphone and directional sound emitter may be located remote from the user. The directional microphone and directional sound emitter may be wirelessly coupled to the communication interface, wire to the communication interface, and/or the like. The directional microphone may include a phased array, a metamaterial array (e.g., an acoustic analog of metamaterial surface antenna technology), and/or the like. The directional microphone and the directional sound emitter may receive an indication of the location of the user from the user-tracking sensor and may target the indicated location for measurement of vocal emissions and delivery of audio. The directional microphone and/or directional sound emitter may move focal direction as the user moves to track the user. The directional sound emitter may be configured to emit ultrasonic sound waves configured to frequency convert to produce desired sounds that are audible to the user. The ultrasonic waves, by virtue of their short wavelengths, can be selectively directed and focused to the user without spreading to other regions; in some embodiments, different ultrasonic waves can be directed to the left and right ears of the user. For example, the ultrasonic sound waves may be premodulated with audible-frequency signals and then be nonlinearly frequency downshifted in the air and/or frequency downshifted in a nonlinear acoustic material in or on the user (e.g., natural tissue near the ear, or nonlinear material in an earpiece) so as to produce audible sounds. The premodulation can be selected such that the audible sounds produced following the nonlinear frequency downshifting form desired sounds, e.g., intelligible human speech. Alternatively, or in addition, a plurality of ultrasonic sound waves may be beat together to frequency convert to the desired frequency. For instance, a 100 kHz wave can be beat together in a nonlinear material (e.g., air, tissue, or an earpiece) with a modulated beam having frequencies of 102-120 kHz to generate audible sounds with frequencies between 2 kHz and 20 kHz.

The communication interface may identify the entity of interest based on a non-tactile input received from the user. In an embodiment, the user-tracking sensor and/or an associated camera may detect a gesture by the user indicative of the entity of interest. For instance, the user may employ 8 different gestures to identify eight different entities of interest. In one embodiment, the user may use fingers or other gestures to display numbers or letters which identify the entities of interest (e.g., from a list). In another embodiment, the user may simply use a pointing gesture to identify a nearby entity of interest. Alternatively, or in addition, the directional microphone may receive vocal emissions from which the communication interface identifies the entity of interest. For example, the vocal emissions may include a spoken command, a name of the entity of interest, and/or the like, and/or the communication interface may identify the entity of interest based on a tone of voice, a subject matter of the vocal emission, and/or the like. Such identifiers need not be by themselves globally unique, but can serve to identify the entity of interest from a limited list of likely entities of interest. For example, if the user has only one acquaintance named Sam, he can identify him by Sam rather than by Samuel James Tyler. Or, if he has 5 acquaintances named William, the phrase "Bill, what did you think of yesterday's meeting" may be sufficient to identify the specific entity of interest, based on the partial name and the joint attendance at a defined meeting. The communication interface may be configured to add additional participants based on vocal emissions and/or gestures by the user, which may be used with any or all of the previous discussed methods of identifying the entity of interest.

The communication interface may perform one or more speech recognition algorithms on the vocal emissions to identify the subject matter of the vocal emissions. The communication interface may track one or more previous subject matters of one or more previous conversations and/or may store one or more keywords from one or more previous conversations, which may then be used to identify the entity of interest. There may be one or more than one subject matter and/or keyword per conversation, and/or a subject matter and/or keyword may be associated with multiple conversations. The communication interface may gather information from an external source (e.g., a website, such as a social media site, and/or the like) to identify the entity of interest. The communication interface may identify the entity of interest based on a recency in time of a previous conversation. The communication interface may simply select a most recent conversation, may weight conversations based on recency and relevance, and/or the like. The communication interface may select the entity of interest based on a single most relevant and/or recent conversation and/or based on a plurality of conversations with the entity of interest. The communication interface may identify the entity of interest based on a physical proximity to the user (e.g., the entity of interest is in an adjacent room, a location of the entity of interest determined by a satellite positioning system, etc.). The communication interface may identify the entity of interest based upon a calendar of the user, e.g., based on the time of a scheduled conversation, the relative order of several scheduled conversations, or the like.

The communication interface may analyze the subject matter of the vocal emissions and/or previous conversations using a language analysis algorithm. In an embodiment, the communication interface may weight the results from a plurality of language analysis algorithms to determine the subject matter of the vocal emissions and/or previous conversations. The communication interface may reject an identification of the entity of interest if a confidence score is below a predetermined threshold. If the identification is rejected, the communication interface may prompt the user to specify the entity of interest. The communication interface may suggest a most likely candidate (e.g., one with a highest confidence score) when prompting the user. In an embodiment, the communication interface may use the language of the vocal emissions to help identify the entity of interest.

The communication interface may be configured to identify the entity of interest solely in response to the vocal emissions without the hands-free intercom first receiving a tactile input. Alternatively, or in addition, the communication interface may determine whether the user would like to communicate using the hands-free intercom without first receiving a predetermined phrase. The communication interface may determine whether the user is talking to an entity other than the user's self, e.g., based on the subject matter of the user's utterances. The communication interface may determine whether the user is talking to a nonresponsive object, such as a plant.

The communication interface may be configured to determine whether or not the entity of interest is within listening range of the user and may communicatively couple the user to the entity of interest if the entity of interest is not within listening range. The communication interface may determine whether the entity of interest is within listening range based on responsive vocal emissions and/or the lack thereof by the entity of interest. The communication interface may determine whether the entity of interest is within listening range based on responsive motion from the entity of interest (e.g., head motion, body motion, eye motion, etc.). The communication interface may determine whether the entity of interest is within listening range based on a measured volume of the vocal emissions (e.g., a volume measured by a directional microphone near the user, a volume measured by a directional microphone near the entity of interest, etc.). The communication interface may determine whether the entity of interest is within listening range based on whether entities of interest were able to hear vocal emissions by the user in previous instances under similar circumstances.

The communication interface may select the entity of interest from among one or more entities being tracked by the user-tracking sensor and/or a plurality of user-tracking sensors. The user-tracking sensor and/or plurality of user tracking sensors may occupy a plurality of locations and/or structures. The communication interface may select the entity of interest from among one or more entities that nominally occupy a structure, such as a structure containing the hands-free interface. The communication interface may select the entity of interest from among one or more entities on a contact list, such as a cell phone contact list, a member/employee list for an organization, and/or the like, and/or from among a user-identified set of entities from the contact list (e.g., a set smaller than the entire contact list). The communication interface may select the entity of interest from among family members of the user. In some embodiments, the entity of interest may be a domesticated animal, such as a pet. The communication interface may select the entity of interest from among frequently contacted entities. The communication interface may identify the user, for example, based on a spoken name, vocal characteristics, a code phrase, facial recognition, and/or the like. The entity of interest may be identified based on which user is using the hands-free intercom.

The communication interface may be configured to determine the communication device to which to couple based on an identity of the entity of interest, a location of the entity of interest, and/or the like. The communication interface may be configured to determine whether the entity of interest is located in a structure containing the hands-free intercom, a structure containing another hands-free intercom, a home, a workplace, a vehicle, and/or the like. The communication interface may be configured to determine whether the entity of interest is accessible via a computer system, such as if the entity of interest is logged into a computer communication service. The communication interface may be configured to determine whether a mobile communication device of the entity of interest (e.g., a cell phone, tablet, etc.) is communicatively coupled to a wireless network. If the communication device is external to the hands-free intercom, external to a structure in which the user is located, and/or the like, the communication interface may encrypt the communicative coupling.

The communication device of the entity of interest may be part of the hands-free intercom. For example, another directional microphone and another directional sound emitter may couple the entity of interest to the user. The communication interface may locate the entity of interest using the user-tracking sensor. For example, the user-tracking sensor may identify the entity of interest based on a gait, a breathing sound, a breathing rate, facial recognition, and/or the like. The communication interface may locate the entity of interest based on a location of a mobile communication device of the entity of interest, for example, by detecting the location of wireless transmission by the mobile communication device, by receiving the location from the mobile communication device, by using a phone number of the mobile communications device, and/or the like. The communication interface may locate the entity of interest based on a beacon coupled to the entity of interest, such as a beacon configured to transmit a signal (e.g., a radio frequency signal, an infrared signal, an electromagnetic signal, an ultrasonic signal, etc.), a beacon configured to distinctively reflect a signal, and/or the like. The communication interface may locate the entity of interest by tracking which doorways the entity of interest has traversed (e.g., by tracking the last doorway traversed by the entity of interest). The hands-free intercom may include sensors configured to detect passage of the entity of interest through doorways. Once the entity of interest is located, the communication interface may couple the user to a directional microphone and directional sound emitter closest to the entity of interest. Alternatively, the communication interface may couple the user to a cell phone, work phone, internet phone or communication service, and/or the like, for example, if the entity of interest is not near a user interface of the hands-free intercom. Accordingly, the communications interface may connect to the entity of interest's communication device via an existing communications network, such as a cellular network, a wifi network, the internet, a wired network, a wireless network, etc. In an embodiment, the communication device of the entity of interest can interact with the user's communication interface without consideration that the user is employing a hands-free intercom, e.g., just as it would interact with a wired or wireless phone.

The communication interface may be configured to summon the entity of interest to a nearest communication device. The communication interface may summon the entity of interest by playing a loud, undirected sound (such as a name, vocal emissions from the user, a tone, etc.) from a sound emitter nearest the entity of interest, by transmitting a text message, by transmitting an email, and/or the like. The communication device may receive a communications request from the communications interface and may summon the entity of interest via summoning signals from the device, such as ringtones, vibrations, lights, etc. The communication device may include a mobile communication device, the hands-free intercom, another hands-free intercom, a computer system, and/or the like.

The communication interface may be configured to determine the availability of the entity of interest. The communication interface may report the determined availability to the user (e.g., using a visual indication, an audible indication, etc.). In some embodiments, the determined availability may be reported only if the entity of interest is unavailable. The availability may include available, occupied, in a call, and/or the like. The communication interface may update the user on the availability of the entity of interest when the availability changes.

The communication interface may be configured to record vocal emissions from the user (e.g., the vocal emissions used to identify the entity of interest) and deliver the recorded vocal emissions after identification of the entity of interest. In some embodiments, the communication interface may strip-out identification phrases before delivering the body of the message. In other embodiments, the identification material forms part of the body of the message and can be analyzed, used to identify and connect to the entity of interest, and then delivered to him. The communication interface may disguise a connection delay from being observable by the entity of interest. The communication interface may deliver an audio indication to the user prior to delivery of the recorded vocal emissions to the entity of interest. The audio indication may include a contact status indicator associated with the communication device, such as a ringing a sound, a busy sound, and/or the like. The communication interface may be configured to mute, pause, terminate, etc. the communicative coupling responsive to a vocal command by the user, a gesture by the user, and/or the like. The communication interface may also, or instead, be configured to mute, pause, terminate, etc. the communicative coupling responsive to a command from the entity of interest, such as a vocal command, an electronic signal from the communication device, and/or the like. The hands-free intercom may indicate to the user when the communicative coupling is paused and/or terminated.

The communication interface may receive a request from a remote entity to communicatively couple to the user. The communication interface may determine whether to couple the remote entity to the user, for example, based on one or more access rules. The communication interface may determine whether to couple the remote entity to the user based on which room the user is occupying (e.g., a bedroom, a bathroom, an office, a kitchen, etc.), based on an activity of the user (e.g., an activity determined by the user-tracking sensor), based on a time of day, based on a day of the week, and/or the like. In an embodiment, the access rules may include room-specific time restrictions. The communication interface may be configured to determine whether to couple the remote entity to the user based on an identity of the remote entity. For example, the communication interface may connect the remote entity without prompting, refuse the request to couple, prompt the user on whether to couple, and/or the like depending on the identity of the remote entity. The communication interface may determine whether to couple the remote entity by prompting the user, and/or the communication interface may determine whether to prompt the user based on access rules. The communication interface may determine whether to couple the remote entity to the user based on an identity of the user. In an embodiment, the user may be an appliance, and the communication interface may determine whether the remote entity can couple to the appliance. In an embodiment, the remote entity may be an appliance, and the communication interface may determine whether the user can couple to the appliance (e.g., whether he is authorized to do so).

The communication interface may be configured to determine whether to couple the remote entity to the user based on a subject matter of the request, an urgency level, a user status received from an electronic calendar, an indication of user availability received from the user, and/or the like. The communication interface may be configured to prompt the user periodically to update the indication of user availability when the user has indicated unavailability. The communication interface may receive an indication of a user-specified period for prompting at the time the user indicates unavailability. The communication interface may determine whether to couple the remote entity to the user based on whether the user is alone, based on an identity of a person near the user, based on a relationship between the remote entity and the person near the user, based on a relationship between a subject matter and the person near the user, and/or the like. The communication interface may be configured to determine whether to forward the request to a user device when the user is out of range of the sound emitter. The communication interface may determine whether to forward the request based on the user device to which the request would be forwarded, based on an identity of the remote entity, and/or the like.

The user-tracking sensor may be configured to detect an eavesdropper. The hands-free intercom may warn the user when an eavesdropper is present. The hands-free intercom may produce an audio indication that an eavesdropper is present (e.g., a tone, a buzz, a vocal indication, etc.), a visual indication that an eavesdropper is present (e.g., a light, etc.), and/or the like. The communication interface may refuse to communicatively couple when an eavesdropper is present. The user-tracking sensor may be configured to detect eavesdroppers in the same room as the user, to detect eavesdroppers within a listening range of the user (e.g., to detect eavesdroppers outside a doorway of a room with the user), and/or the like. The user-tracking sensor may be configured to continuously monitor for eavesdroppers during communicative coupling.

The hands-free intercom may occupy one or more houses, apartments, office buildings, warehouses, restaurants, stores, malls, outdoor facilities, transportation facilities, hospitals, and/or the like. The hands-free intercom may be located indoors and/or outdoors. The hands-free intercom may include a persistent storage device for automatically recording a conversation between the user and the entity of interest. Alternatively, or in addition, the persistent storage device may store a transcription of the conversation. The communication interface may automatically transmit the recording to the participants. The entity of interest may include a person, an appliance, a computer system, and/or the like. The user may include a person, an appliance, a computer system, and/or the like.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers; computer programming tools and techniques; computer networks and networking technologies; digital storage media; authentication; access control; and other security tools and techniques provided by public keys, encryption, firewalls, and/or other means.

FIG. 1 is a perspective view of a user 150 interacting with a hands-free intercom 100. The hands-free intercom 100 may include a user-tracking sensor 110, a directional microphone 120, and a directional sound emitter 130. The directional sound emitter 130 may include a plurality of ultrasonic speakers 131, 132. The user-tracking sensor 110 may determine the location of the user 150. In some embodiments, the user-tracking sensor 110 may also determine the identity of the user 150. The user-tracking sensor 110 may comprise one or more cameras, one or more microphones (which may include directional microphone 120), a radar sensor, an ultrasonic sonar sensor (which may include elements of directional sound emitter 130), or the like. The directional microphone 120 and directional sound emitter 130 may target the user 150 based on location information received from the user-tracking sensor 110. The directional microphone 120 may maximize reception of audio from the direction of the user 150 and/or the user's mouth while minimizing reception of audio from other directions. The directional microphone 120 may be steered mechanically and/or may include a phased array and/or metamaterial array to produce the directional reception.

The directional sound emitter 130 may emit ultrasonic sound waves from the plurality of ultrasonic speakers 131, 132. The plurality of ultrasonic speakers 131, 132 may be aimed so that the ultrasonic sound waves frequency convert to audible frequencies at or near the user's ears. For example, the ultrasonic sound waves may be modulated so as to produce audio of interest in the beat frequency created when the waves interfere. Alternatively, or in addition, the ultrasonic sound waves may be downshifted in the air and/or in a material in or on the user 150. The directional sound emitter 130 may be configured to maximize the volume of audible sound waves at or near the user 150 while minimizing the volume of audible sound waves in other locations. If the user 150 moves, the hands-free intercom 100 may reorient the directional microphone 120 and directional sound emitter 130 towards the user's new position. The directional sound emitter 130 or individual ultrasonic speakers 131, 132 may be steered mechanically and/or may include a phased array and/or metamaterial array to produce the directional emission.

Figure 2:
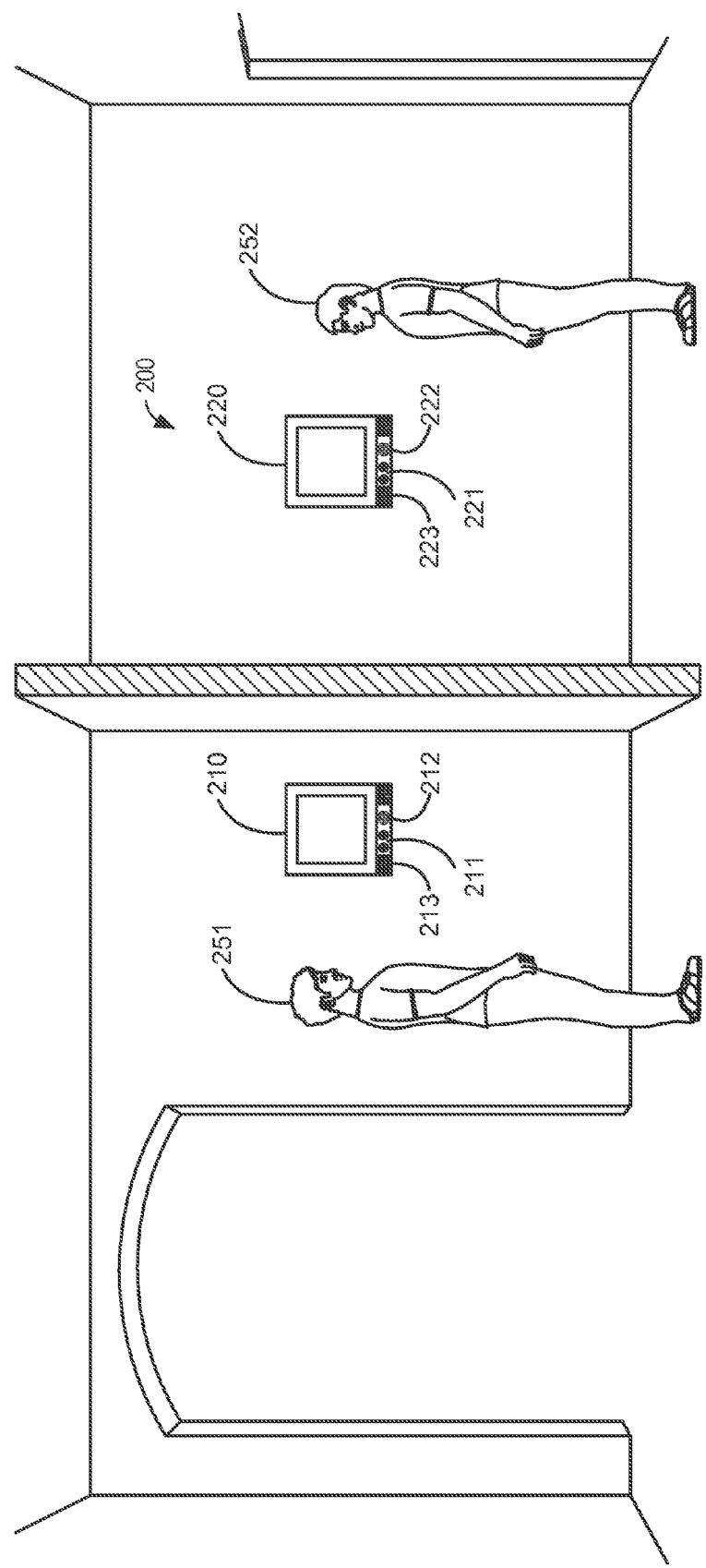
FIG. 2 is a perspective view of a pair of users communicating using a hands-free intercom.

FIG. 2 is a perspective view of a pair of users 251, 252 communicating using a hands-free intercom 200. A first user 251 may make a gesture and/or vocal emissions that indicate he wishes to speak with the second user 252. A first user interface 210 including a first user-tracking sensor 211, a first directional microphone 212, and a first directional sound emitter 213 may detect the gesture and/or vocal emissions. The hands-free intercom 200 may analyze the gesture and/or vocal emissions to determine to whom the first user 251 is interested in speaking. For example, the first user 251 may say, "Have you heard back about your job interview?" and the hands-free intercom 200 may determine that the second user 252 had discussed a job interview with the first user 251 two days prior. Accordingly, the hands-free intercom 200 may decide to couple the first user 251 to the second user 252 and/or may prompt the first user 251 as to whether the second user 252 is the desired recipient.

Once the hands-free intercom 200 has determined that the first user 251 wishes to speak to the second user 252, the hands-free intercom 200 may locate the second user 252. The hands-free intercom 200 may locate the second user 252, for example, with user-tracking sensors 221 on one or more user interfaces 210, 220. The hands-free intercom 200 may then couple the directional microphone 222 and directional sound emitter 223 of the second user interface 220 to the directional microphone 212 and directional sound emitter 213 of the first user interface 210 so the users 251, 252 are able to communicate. There may be some delay while the hands-free intercom 200 analyzes the vocal emissions of the first user 251, identifies the second user 252, locates the second user 252, and communicatively couples the first user 251 to the second user 252. This delay may be hidden from the second user 252 (e.g., by delivering the vocal emissions offset by the delay), so the conversation appears to happen in real time. The first user 251 may be aware of the delay, so the hands-free intercom 200 may alert the first user 251 when the vocal emissions are delivered (e.g., by playing a ringing sound until the vocal emissions are delivered, by playing a tone once the vocal emissions are delivered, by playing the vocal emissions for the first user 251 as they are delivered to the second user 252, etc.). Remaining vocal emissions by the first and second users 251, 252 may be delivered in substantially real time (e.g., only delayed by any inherent delays in the hands-free intercom 200). The first user 251 and/or the second user 251 may be able to control the communicative coupling (e.g., pause, terminate, mute, etc.) using gestures, vocal emissions, and/or the like.

Figure 3:
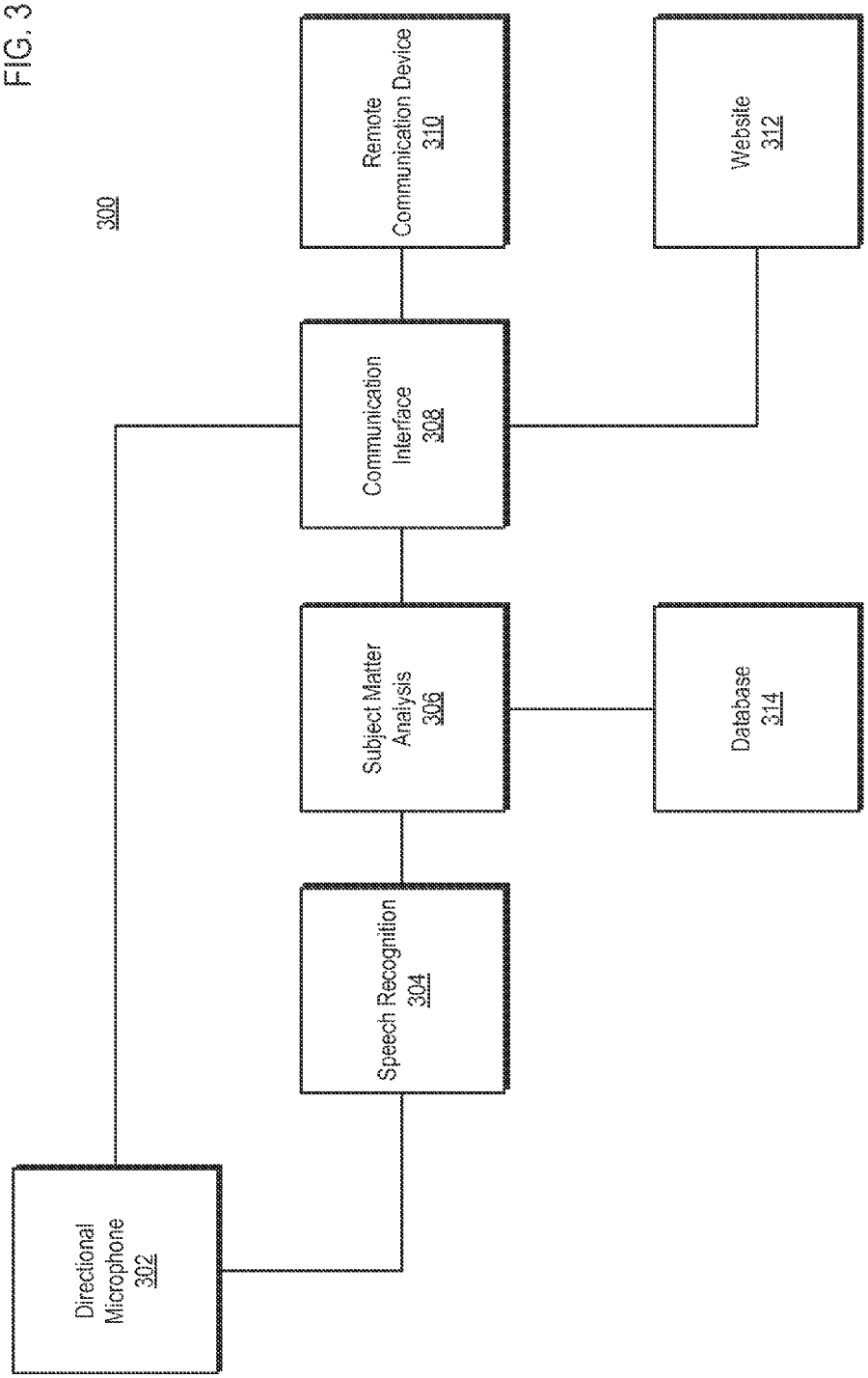
FIG. 3 is a block diagram of a system for analyzing vocal emissions to determine an entity of interest.

FIG. 3 is a block diagram of a system 300 for analyzing vocal emissions to determine an entity of interest. The system 300 may include a directional microphone 302 configured to receive vocal emissions from a user. The measured vocal emissions may be provided to a speech recognition block 304, which may convert the vocal emissions into a form recognizable by the computer (e.g., text, etc.). The results from the speech recognition block 304 may be provided to a subject matter analysis block 306. The subject matter analysis block 306 may determine a subject matter of the vocal emissions. For example, the subject matter analysis block 306 may be coupled to an internal and/or external database 314, which may contain keywords associated with users, subject matters of one or more previous conversations, and/or the like. Alternatively, or in addition, the subject matter analysis block 306 may be coupled to a website 312, such as a social media site, by a communication interface 308. The subject matter analysis block 308 may use one or more language analysis algorithms in combination with data from the database 314 and/or website 312 to identify the entity of interest. The subject matter analysis block 306 may indicate the identified entity of interest to the communication interface 308. The communication interface 308 may be configured to determine a remote communication device 310 of the entity of interest. The communication interface 308 may couple the user to the remote communication device 310 determined.

Figure 4:
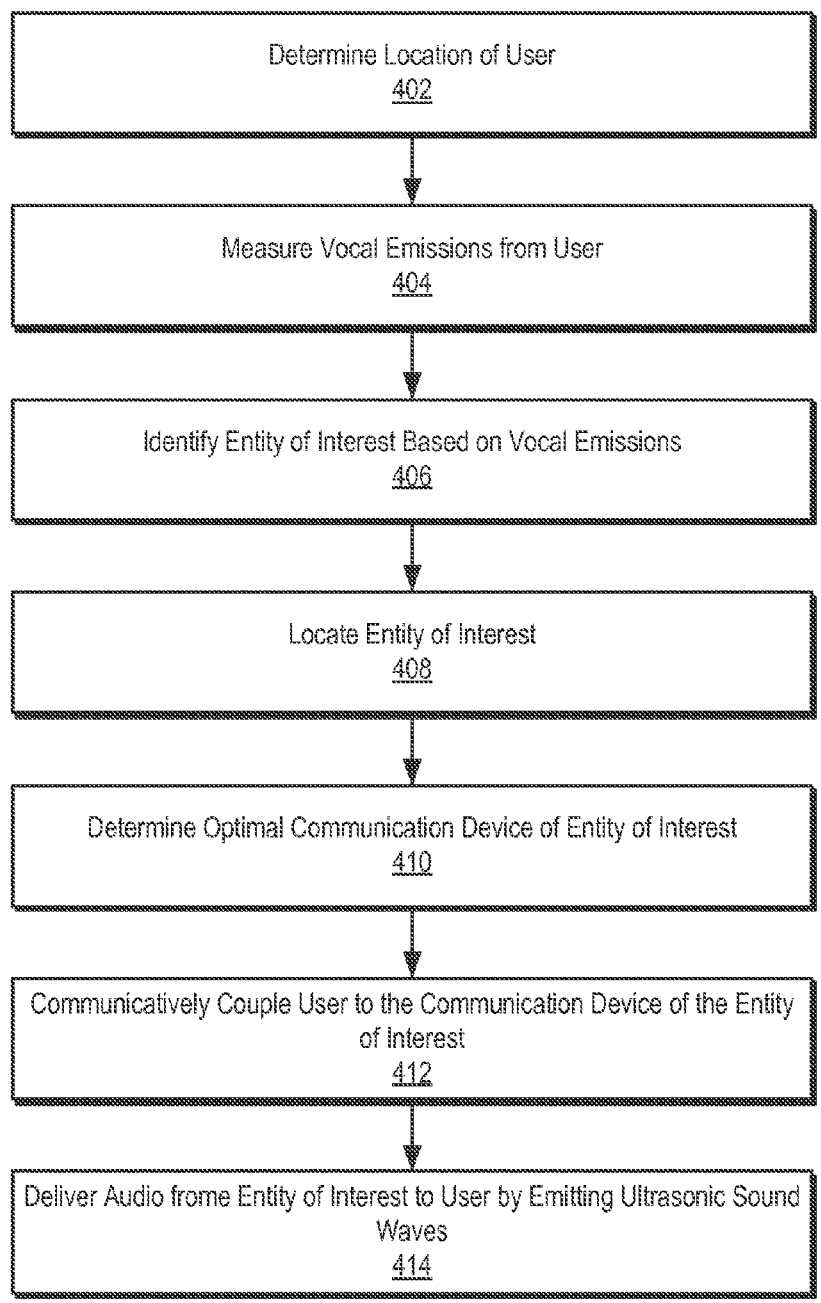
FIG. 4 is a flow diagram of a method for a user of a hands-free intercom to communicatively couple to an entity of interest.

FIG. 4 is a flow diagram of a method 400 for a user of a hands-free intercom to communicatively couple to an entity of interest. The method 400 may begin when a user comes within range of the hands-free intercom. The hands-free intercom may determine 402 a location of the user. The hands-free intercom may orient a directional microphone and a directional sound emitter towards the determined location.

The hands-free intercom may measure 404 vocal emissions from the user if the user says something. Based on the vocal emissions, the hands-free intercom may identify 406 the entity of interest to whom the user wishes to speak. The hands-free intercom may also be configured to determine from the vocal emissions if the user is not interested in using the hands-free intercom. In which case, the hands-free intercom may continue to measure 404 vocal emissions until it determines that the user is interested in communicating to an entity of interest using the hands-free intercom.

Once an entity of interest has been identified, the entity of interest may be located 408 by the hands-free intercom. In some embodiments, the hands-free intercom may prelocate potential entities of interest (e.g., the user's family members, the last five entities he's communicated with, entities identified by his calendar or schedule, etc.) so that the specific entity of interest may be rapidly connected to once identified by the user. The hands-free intercom may locate 408 the entity of interest using a user-tracking sensor, based on a cell phone of the user, based on a beacon, and/or the like. The hands-free intercom may determine 410 an optimal communication device of the entity of interest based on the location of the entity of interest. The hands-free intercom may communicatively couple 412 the user to the optimal communication device of the entity of interest determined in step 410. During communicative coupling, the hands-free intercom may deliver 414 audio received from the entity of interest to the user emitting ultrasonic sound waves to the user. When the communicative coupling is terminated, the method may end.

Figure 5:
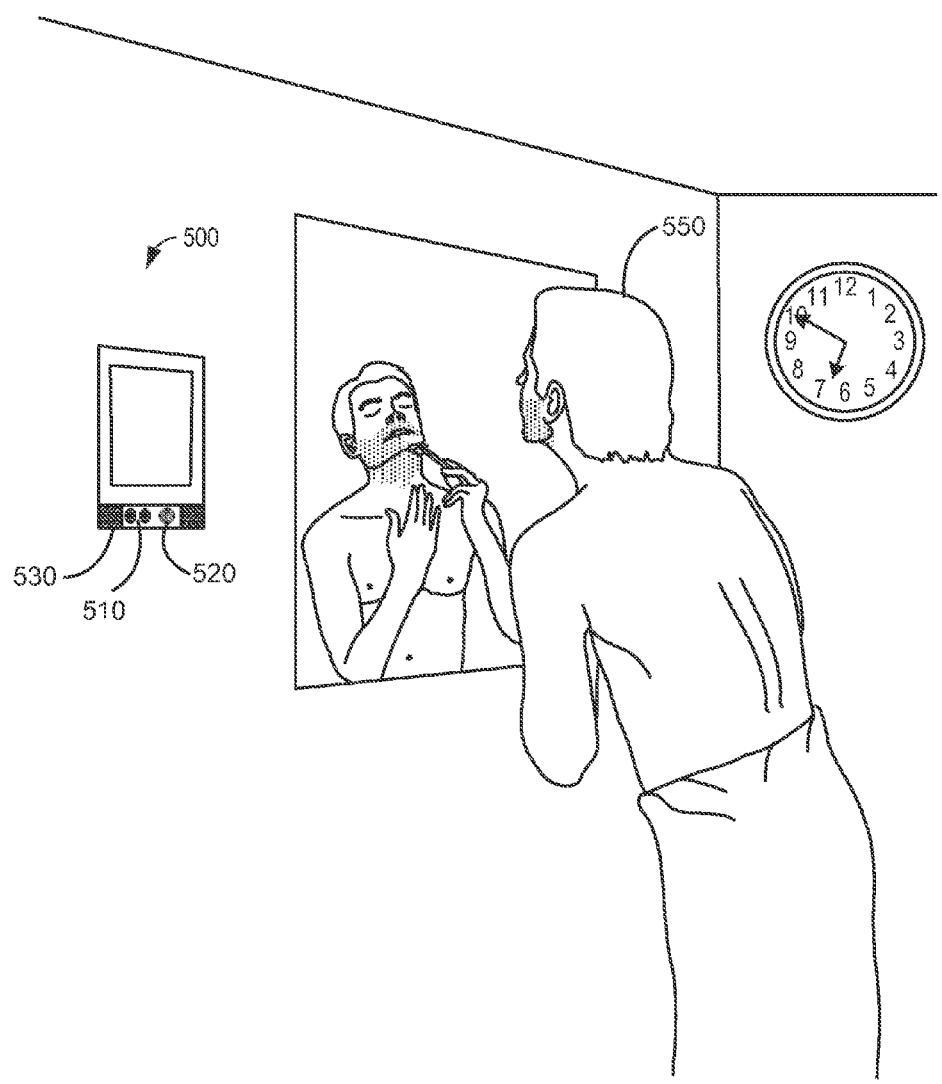
FIG. 5 is a perspective view of a hands-free intercom configured to apply access rules when determining whether to couple a remote entity to a user.

FIG. 5 is a perspective view of a hands-free intercom 500 configured to apply access rules when determining whether to couple a remote entity to a user 550. The hands-free intercom 500 may include a user-tracking sensor 510, a microphone 520, and a directional sound emitter 530. The hands-free intercom 500 may be configured to determine whether to couple a remote entity to the user based on a time, a day, a location of the user 550, an activity of the user 550, an identity of the remote entity, and/or the like. For example, the user 550 may be in a bathroom prior to 7:00 AM, so the hands-free intercom 500 may determine that a remote entity should not be communicatively coupled to the user 550. Alternatively, or in addition, the hands-free intercom 500 may determine that the user 550 is shaving, so the remote entity may not be coupled until the user 550 has finished shaving. The hands-free intercom 500 may allow an immediate family member to contact the user 500 despite the fact the user 550 is shaving but may prevent other remote entities from contacting the user.

The user 550 may be able to provide verbal instructions to the hands-free intercom 500 requesting privacy. The user 550 may be able to specify a predetermined time for the privacy, criteria for ending the privacy period, who or what subject matters may be allowed to couple despite the privacy request, and/or the like. The access rules and/or privacy request may specify entities and/or subject matters that should be rejected outright, entities and/or subject matters that should result in the user being prompted to connect, and entities and/or subject matters that should be automatically connected without prompting. In an embodiment, the hands-free intercom 500 may notify the user 550 of any attempted connections once the access rules no longer prohibit coupling and/or any period of requested privacy has ended. Alternatively, or in addition, the remote entity may record a message, be instructed to call back, and/or the like.

Figure 6:
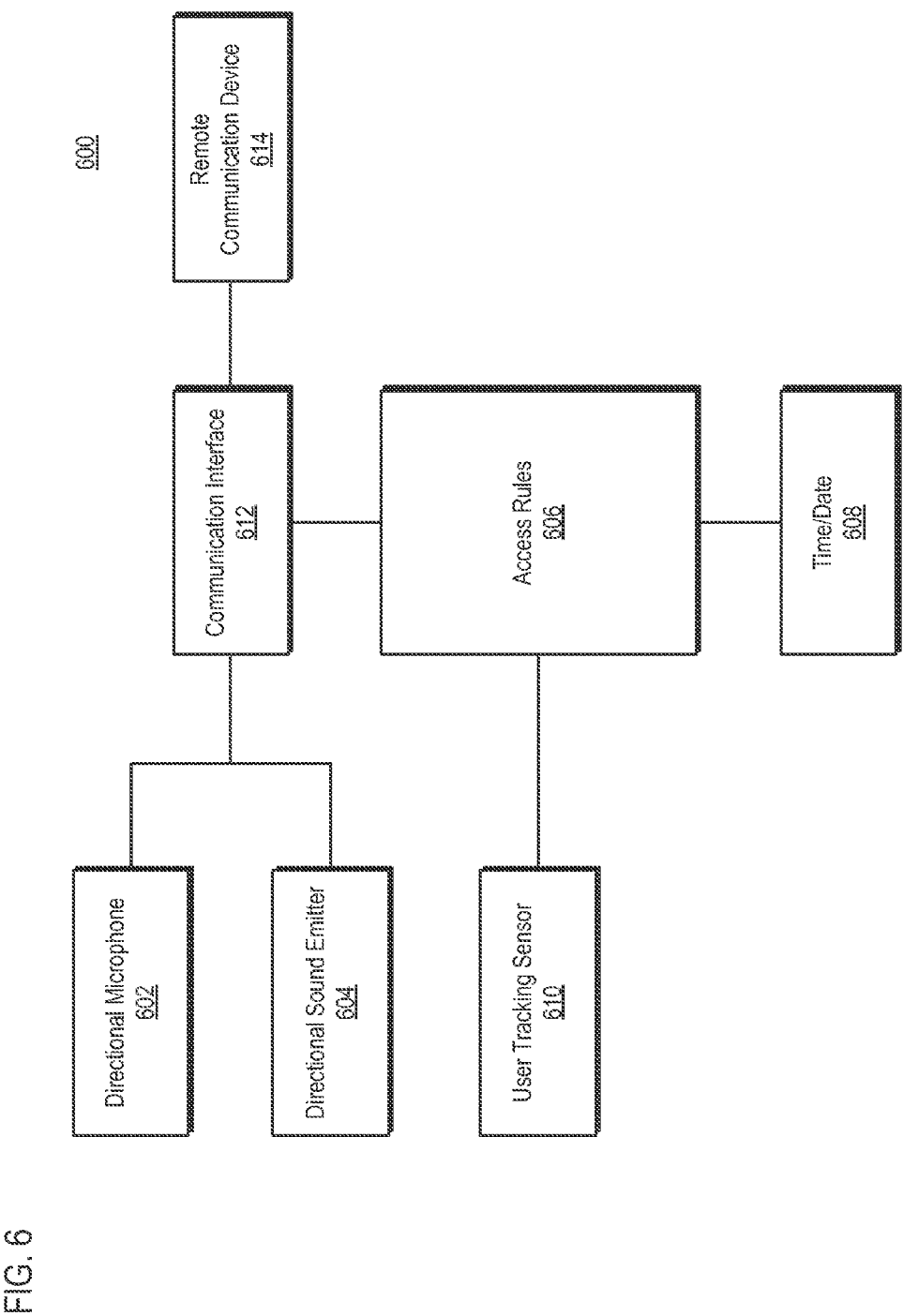
FIG. 6 is a block diagram of a system for determining whether to couple a remote entity according to access rules.

FIG. 6 is a block diagram of a system 600 for determining whether to couple a remote entity according to access rules. A communication interface 612 may be configured to receive a request from a remote communication device 614 to couple to a user. The communication interface 612 may be able to determine from the remote communication device 614 an identity of the remote entity and/or an intended subject matter for the coupling. For example, the communication interface 612 may prompt the communication device 614/remote entity for the subject matter; the communication device 614 may have determined the subject matter from vocal emissions from the remote entity and/or provided the vocal emissions to the communication interface 612; and/or the like.

The communication interface 612 may inform an access rules block 606 of the request to couple. The access rules block 606 may analyze the identity and/or subject matter of the request to determine whether to couple. The access rules block 606 may be coupled to one or more user tracking sensors 610, which may be used to determine which room the user is occupying and/or an activity of the user. Based on the room and/or activity, the access rules block 606 may determine whether to couple the remote entity to the user. The access rules block 606 may be further coupled to a time/date block 608 configured to provide the time, date, day of the week, a user calendar, and/or the like to the access rules block 606 for use in determining whether to couple. The time/date block 608 may be an internal clock, an external time source, a calendar program operating on a user device, and/or the like.

The access rules block 606 may use any combination of data available to it to determine whether to couple the remote entity. The access rules block 606 may use default rules, user-specified rules, rules learned from past user behavior, and/or the like when analyzing the available data to determine whether to couple the remote entity to the user. The communication interface 612 may communicatively couple a directional microphone 602 and a directional sound emitter 604 to the remote communication device 614 if the access rules block 606 determines that coupling should be allowed.

Figure 7:
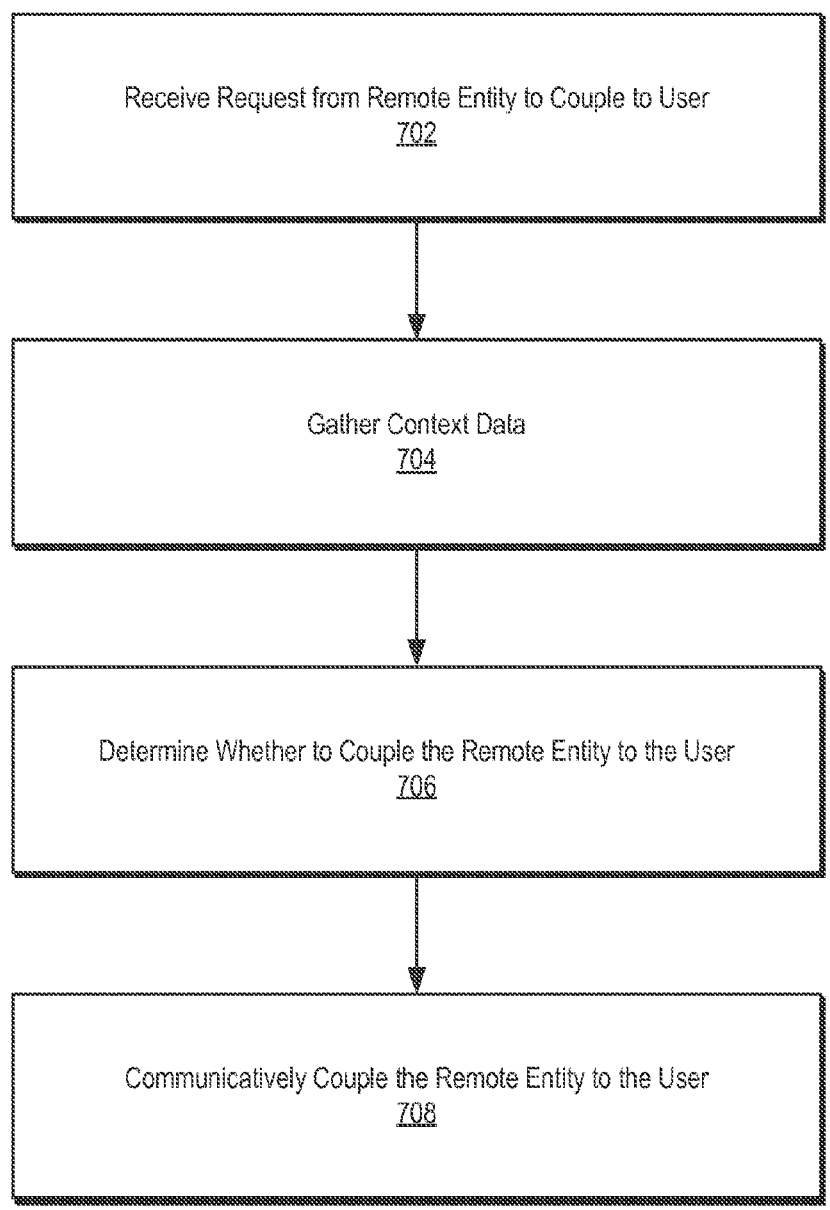
FIG. 7 is a flow diagram of a method for determining whether to couple a remote entity to a user.

FIG. 7 is a flow diagram of a method 700 for determining whether to couple a remote entity to a user. The method 700 may begin when a request is received 702 from a remote entity desiring to communicatively couple with the user. In response to receiving 702 the request, context data may be gathered 704. The context data may include the identity of the remote entity, a subject matter for the communicative coupling, a time, a day of the week, a user activity, a room being occupied by the user, an activity scheduled on a user calendar, and/or the like. The hands-free intercom may decide based on the access rules what context data should be gathered 704, and unnecessary context data may not be gathered. Gathering 704 context data may include periodically acquiring the context data and loading the previously acquired context data when a request is received 702.

Based on the context data, the hands-free intercom may determine 706 whether to couple the remote entity to the user. In an embodiment, access rules may be used to determine 706 whether to couple the remote entity to the user. The access rules may include a user-specified and/or default set of conditions contingent on elements of the context data. Alternatively, or in addition, the hands-free intercom may compare the context data to user behavior when previous requests were received to determine 706 whether to couple the remote entity to the user. The hands-free intercom may communicatively couple 708 the remote entity to the user if it determines that coupling should be performed. The method may end until another request is received.

Figure 8:
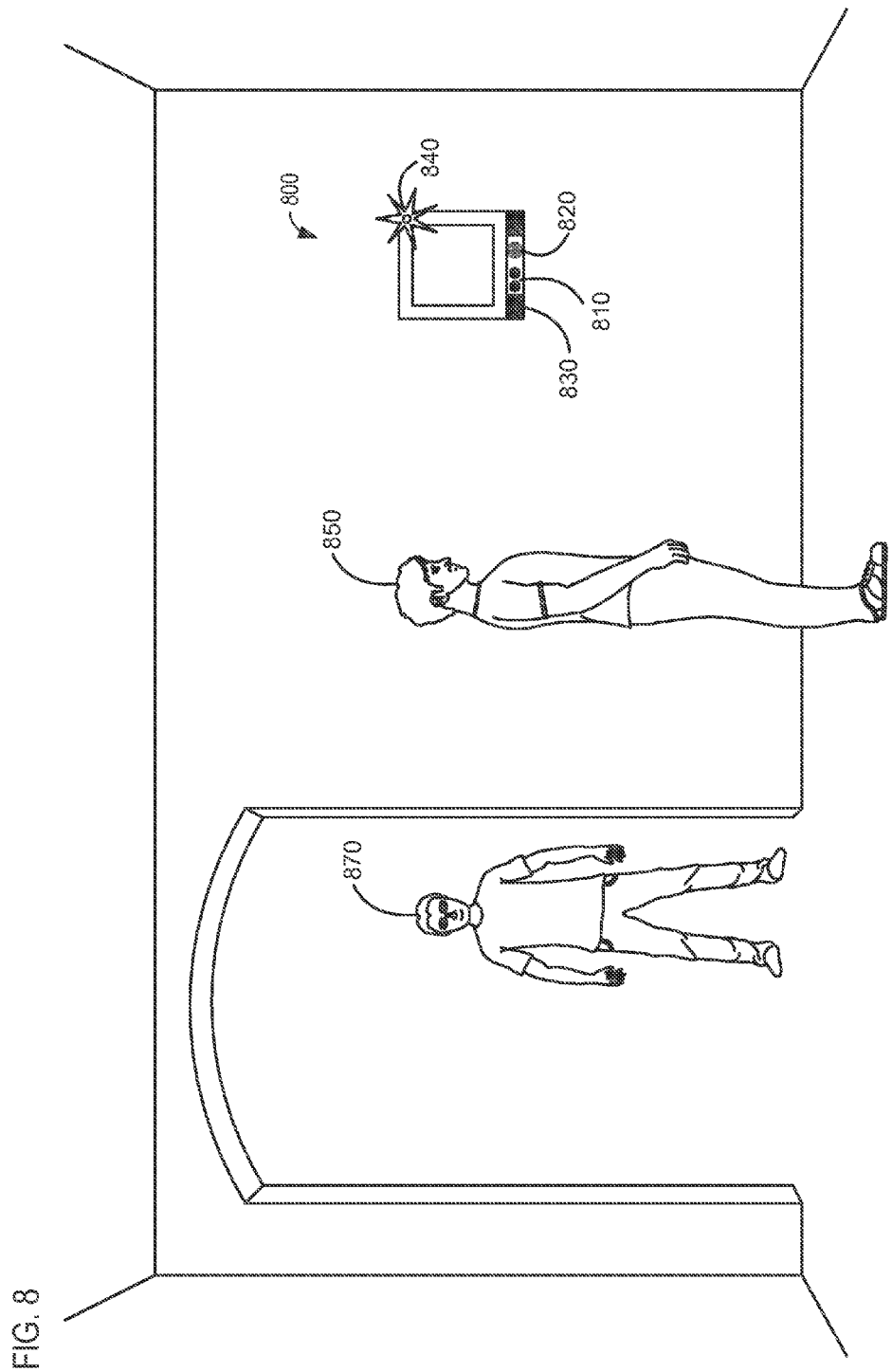
FIG. 8 is a perspective view of a hands-free intercom configured to warn a user about an eavesdropper.

FIG. 8 is a perspective view of a hands-free intercom 800 configured to warn a user 850 about an eavesdropper 870. The hands-free intercom 800 may include a user-tracking sensor 810, a directional microphone 820, a directional sound emitter 830, and an eavesdropper warning light 840. The user 850 may wish to keep some conversations private from eavesdroppers. Accordingly, the hands-free intercom 800 may monitor for eavesdroppers and alert the user 850 when an eavesdropper 870 is detected.

The hands-free intercom 800 may use the user-tracking sensor 810 and/or user-tracking sensors from additional interfaces (not shown) to detect the presence of the eavesdropper 870. Alternatively, or in addition, the user-tracking sensor 810 may detect the presence of the eavesdropper 870 based on the location of a mobile communication device of the eavesdropper 870, by tracking passage of the eavesdropper 870 through one or more doorways, and/or the like. The hands-free intercom 800 may warn of an eavesdropper 870 in a room other than that of the user 850 if it determines that the eavesdropper 870 is still within a listening range. Accordingly, the hands-free intercom 800 may be configured to sense the presence of the eavesdropper 870 in rooms other than the room occupied by the user 850 (e.g., using user-tracking sensors, doorway sensors, sensing of mobile communication devices, etc.).

The hands-free intercom 800 may warn the user 850 of the eavesdropper 870 using the eavesdropper warning light 840. Alternatively, or in addition, the hands-free intercom 800 may produce an audio indication that the eavesdropper 870 is present. The audio indication may be a noise, a tone, speech (e.g., computer-synthesized speech), and/or the like. The directional sound emitter 830 may emit the audio indication so it is only audible by the user 850. In an embodiment, the hands-free intercom 800 may refuse to complete a communicative coupling and/or may pause or terminate a communicative coupling when an eavesdropper 870 is detected. The refusal to complete the communicative coupling may be in addition to or instead of the warning to the user 850.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A hands-free intercommunication system for automatically connecting a user to an entity of interest, the system comprising:
    a user-tracking sensor configured to determine a location of the user;
    a directional microphone configured to measure vocal emissions by the user;
    a directional sound emitter configured to deliver audio from the entity of interest to the user by emitting ultrasonic sound waves configured to frequency convert to produce the audio; and
    a communication interface configured to communicatively couple the directional microphone and the directional sound emitter to a communication device of the entity of interest,
    wherein the communication interface is configured to identify the entity of interest based on the vocal emissions,
    wherein the communication interface is configured to determining whether to couple the remote entity to the user based on which location the user is occupying, and
    wherein the communication interface selects the entity of interest from among one or more entities on a contact list.

2. The system of claim 1, wherein the communication interface is further configured to record the vocal emissions and deliver the recorded vocal emissions after identification of the entity of interest.

3. The system of claim 2, wherein the directional sound emitter is configured to deliver an audio indication to the user prior to delivery of the recorded vocal emissions to the entity of interest.

4. The system of claim 1, wherein the vocal emissions comprise a spoken command from which the communication interface identifies the entity of interest.

5. The system of claim 1, wherein the vocal emissions comprise a name of the entity of interest.

6. The system of claim 1, wherein the communication interface is configured to identify the entity of interest based on a tone of voice of the user.

7. The system of claim 1, wherein the communication interface is configured to identify the entity of interest based on information gathered from a website.

8. The system of claim 1, wherein the communication interface identifies the entity of interest based on a recency in time of a previous conversation.

9. The system of claim 1, wherein the communication interface is configured to identify the entity of interest based on a subject matter of the vocal emissions.

10. The system of claim 9, wherein the communication interface tracks one or more previous subject matters of a previous conversation.

11. The system of claim 9, wherein the communication interface stores one or more keywords from a previous conversation.

12. The system of claim 1, wherein the communication interface is configured to determine whether the entity of interest is within a listening range of the user, and wherein the communication interface is configured to communicatively couple the user to the entity of interest if the entity of interest is not within the listening range.

13. The system of claim 1, wherein the communication interface selects the entity of interest from among a user-identified set of entities from the contact list.

14. The system of claim 1, wherein the communication interface selects the entity of interest from among family members of the user.

15. The system of claim 1, wherein the communication interface selects the entity of interest from among frequently contacted entities.

16. The system of claim 1, wherein the communication interface selects the entity of interest based upon a calendar of the user.

17. The system of claim 1, wherein the communication interface locates the entity of interest using the user-tracking sensor.

18. The system of claim 17, wherein the user-tracking sensor identifies the entity of interest using facial recognition.

19. The system of claim 1, wherein the communication interface locates the entity of interest based on a location of a mobile communication device.

20. The system of claim 1, further comprising one or more sensors configured to detect passage of the entity of interest through one or more doorways, wherein the communication interface locates the entity of interest by tracking which doorways the entity of interest has traversed.

21. A hands-free intercommunication system for automatically connecting a user to an entity of interest, the system comprising:
    a user-tracking sensor configured to:
        determine a location of the user,
        identify a non-tactile gesture by the user, and
        determine the entity of interest based on the gesture;
    a directional microphone configured to measure vocal emissions by the user;
    a directional sound emitter configured to deliver audio from the entity of interest to the user by emitting ultrasonic sound waves that produce the audio by beating a plurality of ultrasonic sound waves together, downshifting the ultrasonic sound waves in the air, downshifting the ultrasonic sound waves in a material on the user, or downshifting the ultrasonic sound waves on a material on the user; and
    a communication interface configured to communicatively couple the directional microphone and the directional sound emitter to the entity of interest.

22. A non-transitory computer readable storage medium comprising program code configured to cause a processor to perform a method for automatically connecting a user to an entity of interest, the method comprising:
    determining a location of the user;
    measuring vocal emissions by the user using a directional microphone;
    identifying the entity of interest based on the vocal emissions by the user;

determining whether to forward the request to a user device when the user is out of range of a sound emitter;

communicatively coupling the user to a communication device of the entity of interest; and delivering audio from the entity of interest to the user by emitting ultrasonic sound waves configured to frequency convert to produce the audio.

23. The non-transitory computer readable storage medium of claim 22, wherein the method further comprises:

receiving a request from a remote entity to communicatively couple to the user; and determining whether to couple the remote entity to the user.

24. The non-transitory computer readable storage medium of claim 23, wherein determining whether to couple comprises determining whether to couple the remote entity to the user based on one or more access rules.

25. The non-transitory computer readable storage medium of claim 24, wherein determining whether to couple comprises determining whether to couple the remote entity to the user based on which room the user is occupying.

26. The non-transitory computer readable storage medium of claim 24, wherein determining whether to couple comprises determining whether to couple the remote entity to the user based on an activity of the user.

27. The non-transitory computer readable storage medium of claim 24, wherein determining whether to couple comprises determining whether to couple the remote entity to the user based on a time of day.

28. The non-transitory computer readable storage medium of claim 24, wherein the access rules include room-specific time restrictions.

29. The non-transitory computer readable storage medium of claim 24, wherein determining whether to couple comprises determining whether to couple the remote entity to the user based on an identity of the remote entity.

30. The non-transitory computer readable storage medium of claim 24, wherein determining whether to couple comprises determining whether to couple the remote entity to the user based on urgency level.

31. The non-transitory computer readable storage medium of claim 24, wherein determining whether to couple comprises determining whether to couple the remote entity to the user based on a subject matter.

32. The non-transitory computer readable storage medium of claim 23, wherein determining whether to couple comprises determining whether to couple the remote entity to the user based on whether the user is alone.

33. The non-transitory computer readable storage medium of claim 23, wherein determining whether to couple comprises determining whether to couple the remote entity to the user based on an identity of a person near the user.

34. The non-transitory computer readable storage medium of claim 22, wherein determining whether to forward comprises determining whether to forward the request based on an identity of the remote entity.

35. The non-transitory computer readable storage medium of claim 22, wherein the method further comprises detecting an eavesdropper within a listening range of a location of the user.

36. The non-transitory computer readable storage medium of claim 35, wherein the method further comprises warning the user of the eavesdropper.

37. The non-transitory computer readable storage medium of claim 35, wherein the method further comprises refusing to communicatively couple the user while the eavesdropper is present.

38. A non-transitory computer readable storage medium comprising program code configured to cause a processor to perform a method for automatically connecting a user to an entity of interest, the method comprising:

determining a location of the user, communicatively coupling the user to the entity of interest;

measuring vocal emissions by the user using a directional microphone;

delivering the measured vocal emissions to the entity of interest; and delivering audio from the entity of interest to the user by emitting ultrasonic sound waves that produce the audio by beating a plurality of ultrasonic sound waves together, downshifting the ultrasonic sound waves in the air, downshifting the ultrasonic sound waves in a material on the user, or downshifting the ultrasonic sound waves on a material on the user.

* * * * *